United States Patent
Zhang

(10) Patent No.: US 9,134,833 B2
(45) Date of Patent: Sep. 15, 2015

(54) ELECTRONIC APPARATUS, METHOD, AND NON-TRANSITORY COMPUTER-READABLE STORAGE MEDIUM

(71) Applicant: KABUSHIKI KAISHA TOSHIBA, Minato-ku, Tokyo (JP)

(72) Inventor: Qi Zhang, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 80 days.

(21) Appl. No.: 13/868,874

(22) Filed: Apr. 23, 2013

(65) Prior Publication Data

US 2014/0035844 A1    Feb. 6, 2014

(30) Foreign Application Priority Data

Aug. 6, 2012 (JP) ................. 2012-174468

(51) Int. Cl.
  *G06F 3/041* (2006.01)
  *G06F 3/0488* (2013.01)
  *G06K 9/00* (2006.01)
(52) U.S. Cl.
  CPC ............ *G06F 3/041* (2013.01); *G06F 3/04883* (2013.01); *G06K 9/00416* (2013.01)
(58) Field of Classification Search
  USPC ......................................... 345/173, 156, 179
  See application file for complete search history.

(56) References Cited

U.S. PATENT DOCUMENTS

| 7,555,705 | B2 | 6/2009 | Chen et al. | |
| 2007/0013667 | A1* | 1/2007 | Chong | 345/173 |
| 2008/0231635 | A1* | 9/2008 | Saund | 345/440 |
| 2009/0256808 | A1* | 10/2009 | Kun et al. | 345/173 |

FOREIGN PATENT DOCUMENTS

| JP | 03-006664 A | 1/1991 |
| JP | 2004-206654 A | 7/2004 |
| JP | 2005-085285 A | 3/2005 |
| JP | 2009-098763 A | 5/2009 |

* cited by examiner

*Primary Examiner* — Thuy Pardo
(74) *Attorney, Agent, or Firm* — Knobbe, Martens, Olson & Bear LLP

(57) ABSTRACT

An electronic apparatus includes a touch screen display and a processor. The processor is configured to output, on a screen of the touch screen display, information regarding a plurality of strokes that are input on the touch screen display. When a first stroke indicative of a selection of a first stroke group on the screen of the touch screen display and a second stroke indicative of a request for a search process are input, the processor is configured to output, on the screen of the touch screen display, information regarding a second stroke group with a degree of similarity to the first stroke group equal to or larger than a threshold value.

17 Claims, 8 Drawing Sheets

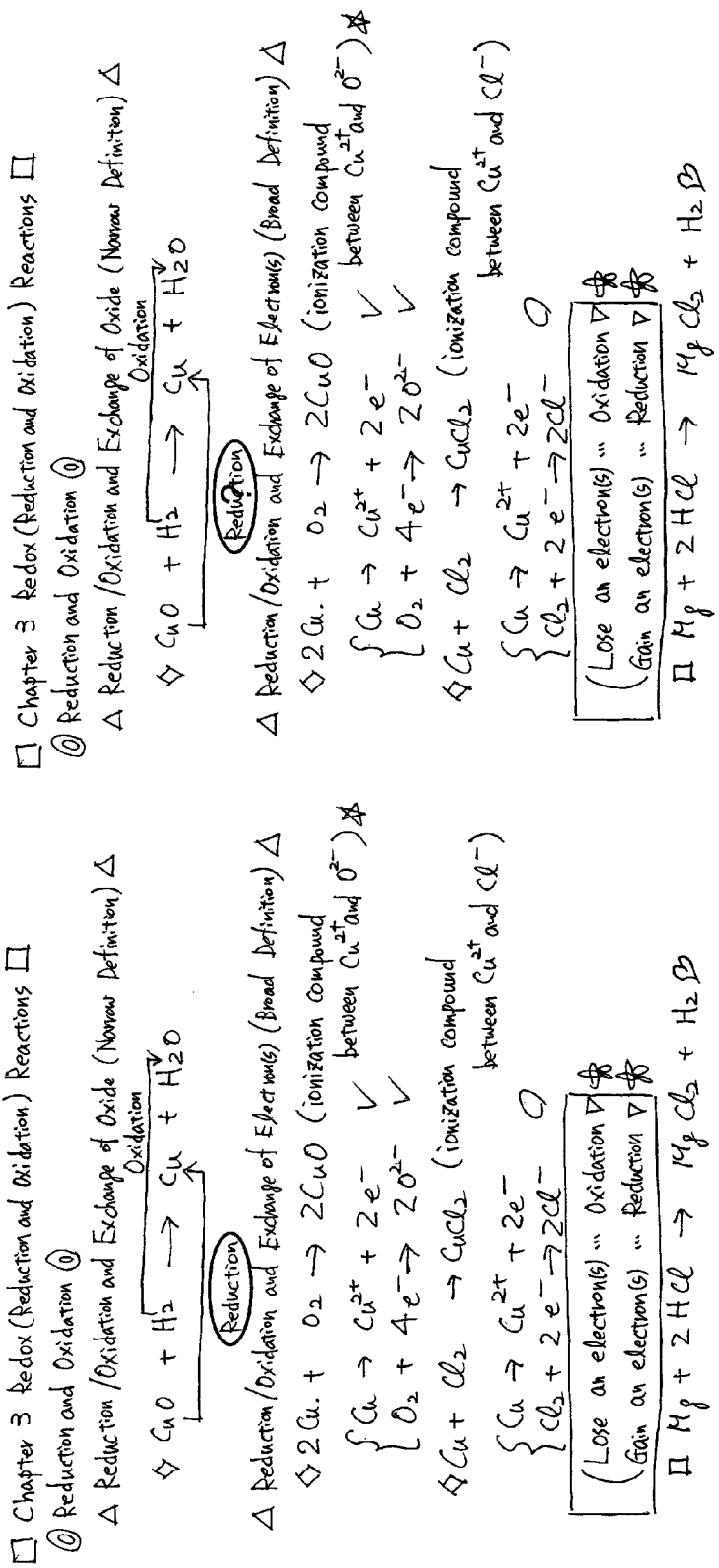

ELECTRONIC APPARATUS, METHOD, AND NON-TRANSITORY COMPUTER-READABLE STORAGE MEDIUM

CROSS-REFERENCE TO RELATED APPLICATION(S)

The present disclosure claims priority to Japanese Patent Application No. 2012-174468, filed on Aug. 6, 2012, which is incorporated herein by reference in its entirety.

TECHNICAL FIELD

Embodiments described herein relate generally to a technique for handling handwritten documents.

BACKGROUND ART

In recent years, various electronic apparatus such as a tablet PC, a PDA, and a smartphone have been developed. To facilitate user input manipulations, many of these kinds of electronic apparatus are equipped with a touch screen.

A user can instruct an electronic apparatus to perform a function that is correlated with a menu item or an object displayed on a touch screen display by touching it with his or her finger, for example.

However, many of existing electronic apparatus having a touch screen display are not necessarily suitable for business scenes such as meetings, business negotiations, and development of products. This is why even now paper notebooks are widely used in business scenes.

BRIEF DESCRIPTION OF THE DRAWINGS

FIGS. 7A to 7D show exemplary user interface images of the digital notebook application program.

DETAILED DESCRIPTION

According to one embodiment, an electronic apparatus includes a touch screen display and a processor. The processor is configured to output, on a screen of the touch screen display, information regarding a plurality of strokes that are input on the touch screen display. When a first stroke indicative of a selection of a first stroke group on the screen of the touch screen display and a second stroke indicative of a request for a search process are input, the processor is configured to output, on the screen of the touch screen display, information regarding a second stroke group with a degree of similarity to the first stroke group equal to or larger than a threshold value.

Embodiments of the invention will be hereinafter described.

Figure 1:
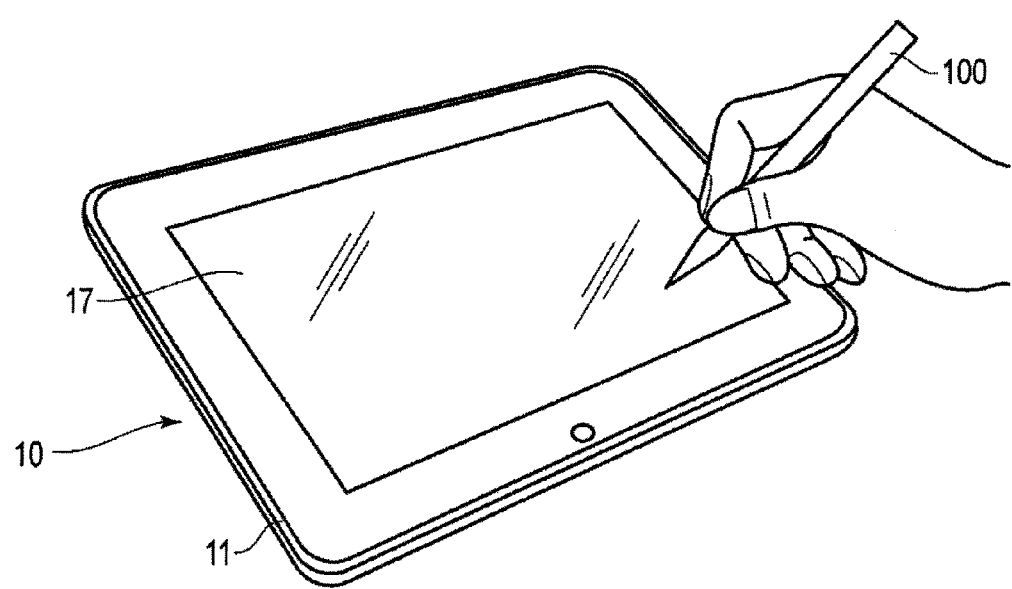
FIG. 1 is a perspective view showing an appearance of an electronic apparatus according to an embodiment.

FIG. 1 is a perspective view showing an appearance of an electronic apparatus according to one embodiment. The electronic apparatus can accept handwriting inputs using a pen, a finger, or the like. Examples of the electronic apparatus include table PCs, slate PCs, notebook PCs, smartphones, PDAs, large displays to replace whiteboards, etc. The case where the electronic apparatus is a tablet PC 10 will be described below. The tablet PC 10 is an electronic apparatus that is also referred to as a tablet computer or a slate computer. The tablet PC 10 includes a main body 11 and a touch screen display 17. The touch screen display 17 is attached to the main body 11 so as to overlap thereon.

Figure 5:
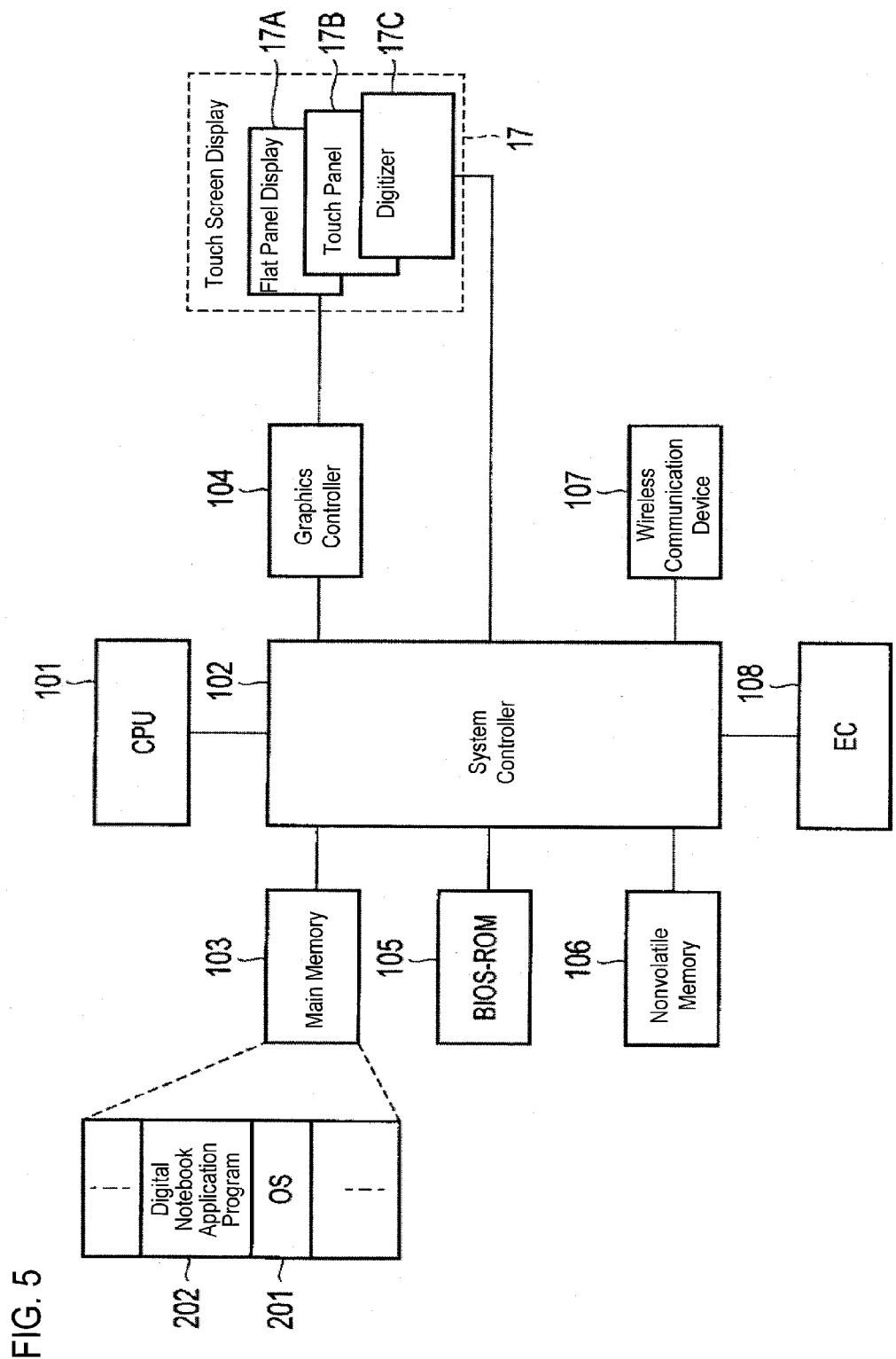
FIG. 5 is a block diagram showing an exemplary configuration of the electronic apparatus according to the embodiment.

The main body 11 has a thin, box-shaped casing. The touch screen display 17 may be of any type as long as it serves as both of a color or monochrome display capable of displaying electronic data and an input device capable of detecting a pen or finger contact position on the screen (surface). For example, as shown in FIG. 5, the touch screen display 17 has a flat panel display 17A and a sensor configured to detect a pen or finger contact position on the screen of the flat panel display 17A. The flat panel display 17A may be a liquid crystal display (LCD), an organic EL display, or the like. The sensor is a capacitive touch panel, an electromagnetic induction type digitizer, and/or the like. The following description will be directed to the case where the touch screen display 17 incorporates two types of sensors, that is, a touch panel 17B and a digitizer 17C. The touch panel 17B and the digitizer 17C are disposed so as to cover the screen of the flat panel display 17A.

The touch screen display 17 can detect not only a touch manipulation on the screen using a finger but also a touch manipulation on the screen using a pen 100. The pen 100 may be an electromagnetic induction pen. A user can input a character(s), a figure(s), and/or the like through the touch screen display 17 by handwriting using an external object (e.g., the pen 100 or a finger). A stroke may be any locus of a handwriting input, such as a locus of an input on the touch screen display 17 using an external object or a locus of a handwriting input that is made through another kind of user interface. For example, a locus of a movement of an external object during a period in which the external object is kept in contact with the screen corresponds to one stroke. The touch screen display 17 displays, on the screen in real time, a locus of a movement of an external object, that is, a handwriting stroke.

Electronic data of a handwritten document (hereinafter, which will be simply referred to as a handwritten document) is a set of information of many strokes corresponding to handwritten characters, figures, etc. The handwritten document is stored in a recording medium incorporated in the tablet PC 10, another electronic owned by a user, a server, or a cloud. In the embodiment, the handwritten document is stored in the recording medium not as image data but as time-series information including (i) coordinate sequences of respective strokes (loci) and (ii) information indicating an order relationship between the strokes. The time-series information may be in any form as long as it is data (hereinafter, referred to as stroke data) which can indicate a handwriting order of plural strokes (stroke order) and can specify the individual strokes (loci). The time-series information will be described in detail with reference to FIG. 4 later. Each stroke data corresponds to one stroke and includes coordinate data of respective points on the locus of the stroke. An arrangement order of the stroke data included in the time-series information may indicate a handwriting order of the strokes, that is, a stroke order. The time-series information may further include information indicating a handwriting order of strokes (stroke order) corresponding to respective stroke data. The time-series information may still further include time information indicating times at which strokes corresponding to respective stroke data are handwritten. The following description will be directed to the case where the handwritten document is stored as the time-series information. The handwritten document, however, may be stored in such a form as not to indicate a handwriting order of plural strokes (stroke order).

The tablet PC 10 can display, on the screen, plural strokes indicated by time-series information. The tablet PC 10 has an edit function. The edit function may include a function(s) of deleting or moving an arbitrary stroke, an arbitrary handwritten character, or the like in a handwritten document being displayed according to a user manipulation using an eraser tool, a range specifying tool, or any of other kinds of tools and/or a function of canceling a history of several handwriting manipulations according to the user manipulation using the eraser tool, the range specifying tool, or any of the other kinds of tools.

The time-series information (or the handwritten document) can be managed in units of a page or in units of plural pages. Also, the time-series information (or the handwritten document) may be recorded so as to be divided in units of an area (pages) that can be included (displayed) on the screen. The page size may be variable. Since the page size (an area of a page) can be set larger than the size of the screen, a handwritten document whose area is larger than the size of the screen can be handled as one page. When an entire single page cannot be displayed on the touch screen display 17 at a time, the page may be reduced or a portion, to be displayed, of the page may be moved by vertical or horizontal scrolling.

Figure 2:
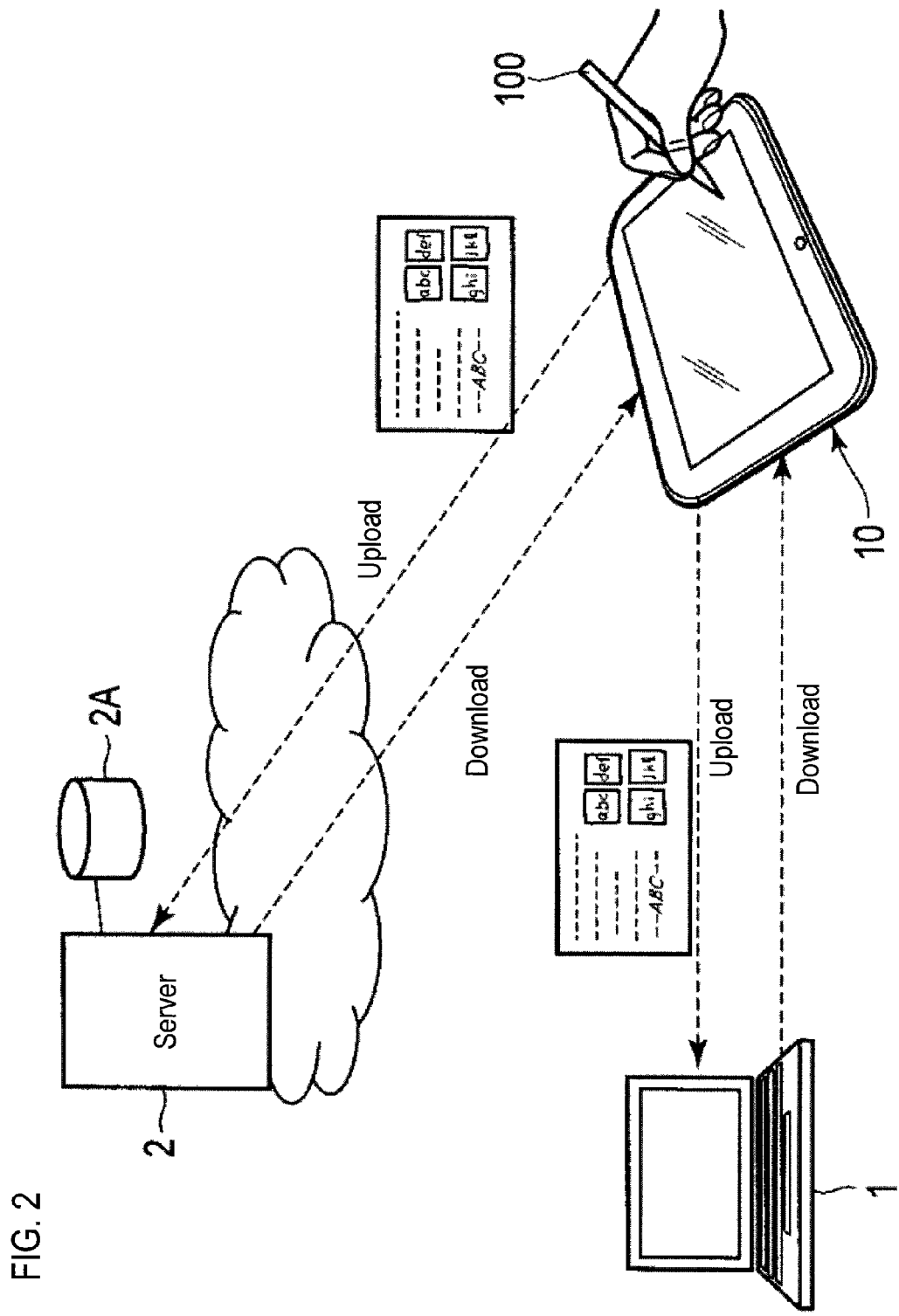
FIG. 2 illustrates an exemplary coordinated operation between the electronic apparatus according to the embodiment and an external apparatus.

FIG. 2 illustrates an exemplary coordinated operation between the tablet PC 10 and an external apparatus. The tablet PC 10 can cooperate with a personal computer 1 and/or a cloud. The tablet PC 10 is equipped with a communication device such as a wired LAN, a wireless LAN, a cellular system (e.g., 3G, LTE, LTE-Advanced, etc.), etc. and thus can communicate with the personal computer 1 and/or a server 2. The server 2 may be a server which provides an online storage service or any of various other cloud computing services.

The personal computer 1 is equipped with a storage device such as a hard disk drive (HDD) and/or a semiconductor memory (e.g., NAND memory or NOR memory). The tablet PC 10 can send time-series information (a handwritten document) to the personal computer 1 over a network and have the time-series information (the handwritten document) recorded in the storage device of the personal computer 1 (upload). To establish a secure communication between the tablet PC 10 and the personal computer 1, authentication processing may be performed therebetween at start of the communication. In this manner, even if the capacity of the storage of the tablet PC 10 is small, the tablet PC 10 can handle many pieces of time-series information (many handwritten documents) or a large amount of time-series information (a large-size handwritten document). The tablet PC 10 can read an arbitrary one or more pieces of time-series information from the storage device of the personal computer 1 (download) and display strokes indicated by the read-out time-series information on the screen of the touch screen display 17.

The communication destination of the tablet PC 10 may be the server 2 on a cloud which provides a storage service, for example. The tablet PC 10 can send time-series information (a handwritten document) to the server 2 over a network and have the time-series information (the handwritten document) recorded in a storage device 2A of the server 2 (upload). The tablet PC 10 can read arbitrary time-series information from the storage device 2A of the server 2 (download) and display loci of respective strokes indicated by the read-out time-series information on the screen of the touch screen display 17 of the tablet PC 10.

As described above, in the embodiment, the storage medium configured to store the time-series information (the handwritten document(s)) may be any storage device so long as it can be accessed by the tablet PC 10. For example, the storage medium may be the storage device provided in the tablet PC 10, the storage device provided in the personal computer 1, the storage device 2A of the server 2, or the like.

Figure 3:
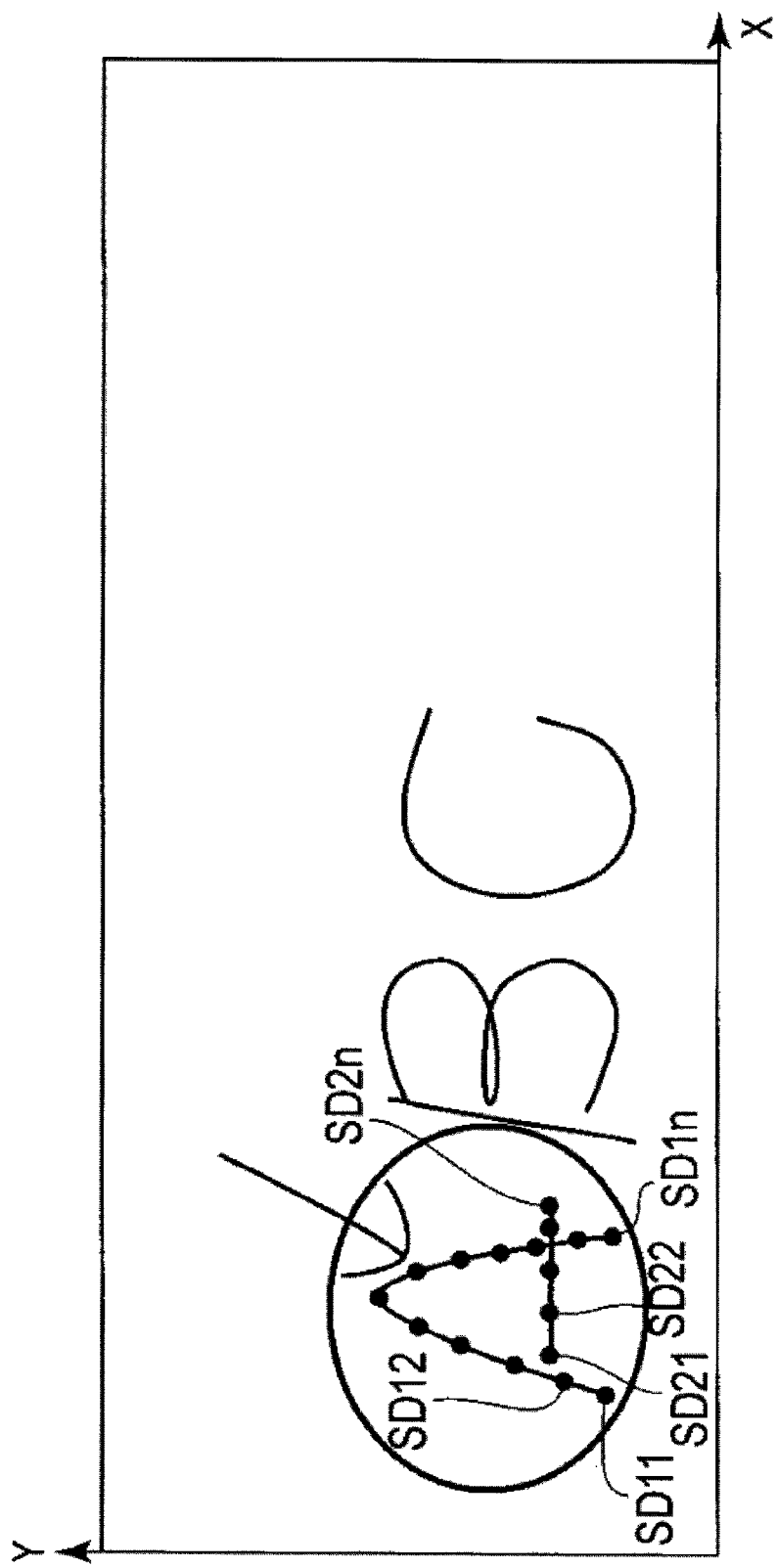
FIG. 3 shows an exemplary handwritten document which has been handwritten on the electronic apparatus according to the embodiment.

Next, a relationship between strokes (a character(s), a mark(s), a figure(s), a table(s), and/or the like) which are handwritten by a user and time-series information will be described with reference to FIGS. 3 and 4. FIG. 3 shows an exemplary handwritten document which has been handwritten on the touch screen display 17 with the pen 100 or the like. In a handwritten document, another character, another figure, or the like may be further handwritten on a character, a figure, or the like that has already been handwritten. In the example of FIG. 3, it is assumed that a character string "ABC" was handwritten in order of "A," "B," and "C" and then, an arrow was handwritten very close to the handwritten character "A."

Figure 4:
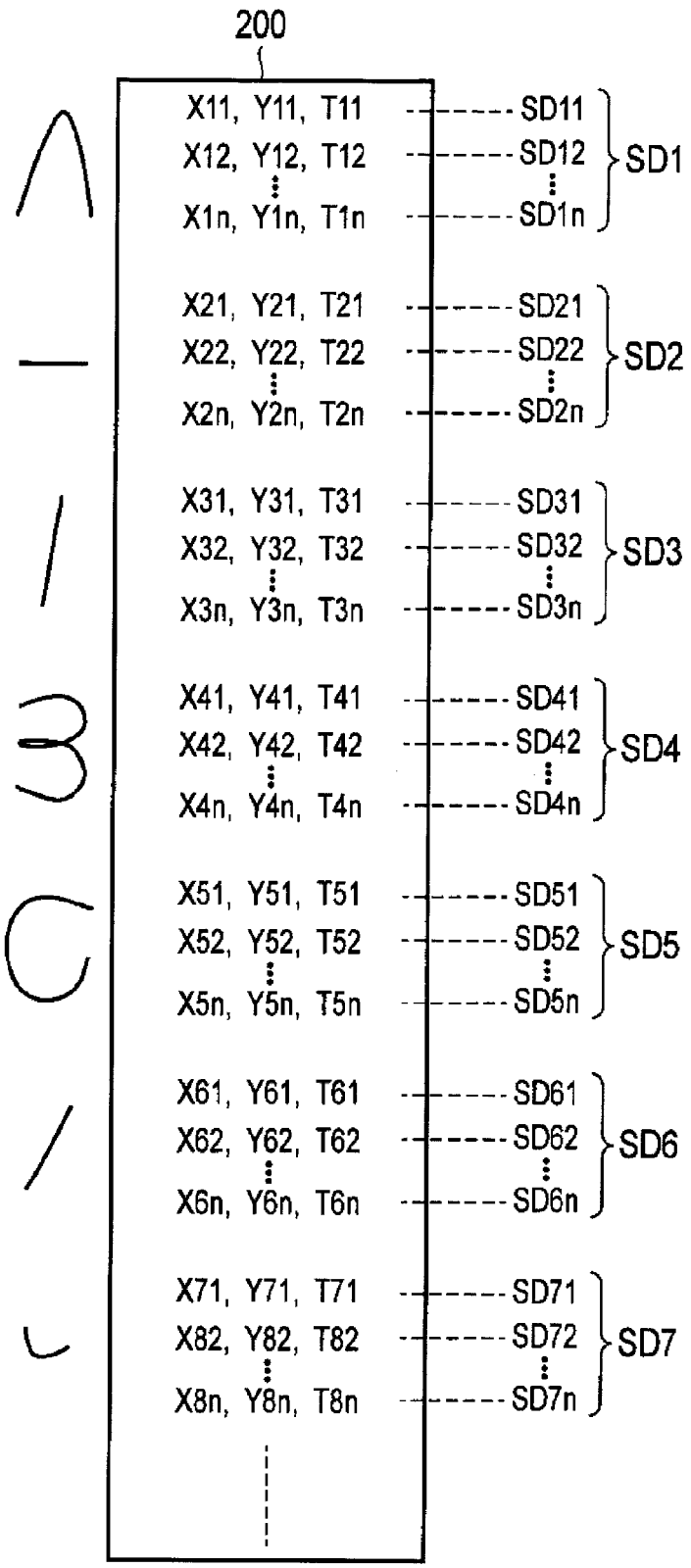
FIG. 4 shows examples of time-series information stored in the electronic apparatus according to the embodiment.

FIG. 4 shows time-series information 200 which corresponds to the handwritten document shown in FIG. 3. The time-series information 200 includes plural stroke data SD1, SD2, . . . , SD7. In the time-series information 200 shown in FIG. 4, the stroke data SD1, SD2, . . . , SD7 are arranged in order of occurrence of strokes (loci) (in time-series order).

The handwritten character "A" includes two strokes (two loci shaped like "Λ" and "-") which were handwritten with the pen 100 or the like. The "Λ"-shaped locus of the pen 100 which is first handwritten is sampled in real time at regular time intervals, for example, whereby its stroke data SD1 (time-series sets of coordinates SD11, SD12, . . . , SD1$n$) is obtained. Likewise, the "-"-shaped locus of the pen 100 which is next handwritten is sampled whereby its stroke data SD2 (time-series sets of coordinates SD21, SD22, . . . , SD2$n$) is obtained. The handwritten character "B" is represented by two stroke data SD3 and SD4 (time-series sets of coordinates SD31, SD32, . . . , SD3$n$ and SD41, SD42, . . . , SD4$n$). The handwritten character "C" is represented by single stroke data SD5 (time-series sets of coordinates SD51, SD52, . . . , SD5$n$). The handwritten arrow mark is represented by two stroke data SD6 and SD7 (time-series sets of coordinates SD61, SD62, . . . , SD6$n$ and SD71, SD72, . . . , SD7$n$).

Each stroke data includes a coordinate data sequence (time-series sets of coordinates) corresponding to one stroke, that is, plural sets of coordinates corresponding to respective plural points on the locus of one stroke. For example, in the case of the handwritten character "A," the stroke data SD1 includes a coordinate data sequence (time-series sets of coordinates) corresponding to points on the "Λ"-shaped stroke of the handwritten character "A," that is, the n pieces of coordinate data SD11, SD12, . . . , SD1$n$. The stroke data SD2 includes a coordinate data sequence corresponding to points on the "-"-shaped stroke of the handwritten character "A," that is, the n pieces of coordinate data SD21, SD22, . . . , SD2$n$. The number n of coordinate data may vary from one stroke data to another stroke data.

Each coordinate data includes an X coordinate and a Y coordinate of one point on a corresponding locus. For example, the coordinate data SD11 includes an X coordinate X11 and a Y coordinate Y11 of the start point of the "Λ"- shaped stroke. The coordinate data SD1n includes an X coordinate X1n and a Y coordinate Y1n of the end point of the "A"-shaped stroke.

Each coordinate data may include time stamp information T indicating a time at which the corresponding point is handwritten. The handwriting time may be either of an absolute time (e.g., year/month/date/hours/minutes/seconds) or a relative time with respect to a certain reference time. For example, each stroke data may be such that an absolute time (e.g., year/month/date/hours/minutes/seconds) of the start of a corresponding stroke is included as time stamp information T of the first coordinate data and a relative time which is a difference from the absolute time of the start of the corresponding stroke is included as time stamp information T of each of the remaining coordinate data. The coordinate data (time-series information) including the time stamp information T makes it possible to indicate a temporal relationship between strokes more accurately.

Furthermore, each coordinate data may include information Z indicating touch pressure. The coordinate data (time-series information) including the information Z indicating the touch pressures, which indicate peculiarities of an individual who has made each handwriting input stroke with high accuracy, makes it possible to determine the person who has made each handwriting input stroke.

Using an order of strokes makes it possible to discriminate a tip portion of the handwritten arrow mark from the handwritten character "A" (i.e., to determine that they are a character(s) and/or a figure(s) which are different from each other) even if the tip portion of the handwritten arrow mark is superimposed on or written very close to the handwritten character "A."

For example, based on the time-series information 200, the CPU of the tablet PC 10 can determine that the two strokes (having the stroke data SD1 and SD2) of the handwritten character "A" were handwritten continuously and determine that the tip portion (having the stroke data SD7) of the handwritten arrow mark was handwritten after the handwritten characters "B" and "C" and that the handwriting timing of the arrow mark was discontinuous with that of the handwritten character "A." Therefore, the CPU of the tablet PC 10 can discriminate the two strokes of the handwritten character "A" and the tip portion of the handwritten arrow mark from each other (i.e., determine that they are a character(s) and/or a figure(s) which are different from each other).

Furthermore, for example, if the difference between the time at which the strokes of the stroke data SD1 and SD2 were handwritten and the time at which the stroke of the stroke data SD7 was handwritten is equal to or larger than a threshold value, the CPU of the tablet PC 10 can determine, using the time stamp information T, that the handwriting timing of the stroke data SD7 is discontinuous with the handwriting timings of the stroke data SD1 and SD2 and that the stroke data SD1 and SD2 and the stroke data SD7 correspond to a character(s) and/or a figure(s) which are different from each other.

Now assume that, as shown in FIG. 3, the user has input a solid-line (thick-line) circle (stroke) by handwriting to thereby designate some of the strokes displayed on the screen by the handwritten circle. The range (specified range) enclosed by the handwritten circle contains the two strokes of the handwritten character "A" and the one stroke of the tip portion of the handwritten arrow mark. In this case, since the CPU of the table PC 10 can discriminate the two strokes of the handwritten character "A" (stroke data SD1 and SD2) and the one stroke of the tip portion of the handwritten arrow mark (stroke data SD7) (i.e., determine that they are different from each other), the CPU of the tablet PC 10 can display, to the user, an interface which enables selection of one of them.

In the time-series information 200, the arrangement of the stroke data SD1, SD2, . . . , SD7 indicates the stroke order of the handwritten document. For example, the arrangement of the stroke data SD1 and SD2 indicates that the "Λ"-shaped stroke was handwritten first and then the "-"-shaped stroke was handwritten. Therefore, even if two handwritten characters have similar loci, they can be determined to be different characters if they are different from each other in stroke order.

Since a handwritten document is stored as time-series information which is a set of time-series stroke data, handwritten characters can be dealt with independently of their language. As such, the same tablet PC 10 can be used in various countries in the world in which different languages are used.

FIG. 5 is a block diagram showing the exemplary system configuration of the tablet PC 10. As shown in FIG. 5, the tablet PC 10 is equipped with a CPU 101, a system controller 102, a main memory 103, a graphics controller 104, a BIOS-ROM 105, a nonvolatile memory 106, a wireless communication device 107, an embedded controller (EC) 108, etc.

The CPU 101 is a processor configured to control the operations of various modules of the tablet PC 10. The CPU 101 runs various types of software which are loaded into the main memory 103 from the nonvolatile memory 106 serving as the storage device. The software includes an operating system (OS) 201 and various application programs such as a digital notebook application program 202. The digital notebook application program 202 serves to realize a function of generating and displaying the handwritten document described above, a function of editing the handwritten document, a loci search function, a character/figure/table recognizing function, etc. The CPU 101 also runs BIOS (basic input/output system) which is stored in the BIOS-ROM 105. The BIOS is programs for hardware control.

The system controller 102 is a device configured to connect a local bus of the CPU 101 to various components. The system controller 102 incorporates a memory controller configured to access-control the main memory 103. The system controller 102 also has a function of communicating with the graphics controller 104 via, for example, a serial bus of the PCI Express standard.

The graphics controller 104 is a display controller configured to control the flat panel display 17A (for example, the LCD) which is used as a display monitor of the tablet PC 10. A display signal generated by the graphics controller 104 is sent to the flat panel display 17A. The flat panel display 17A displays an image based on the display signal. The touch panel 17B and the digitizer 17C are provided on the flat panel display 17A. The touch panel 17B is a capacitive pointing device which enables an input through the screen of the flat panel display 17A. A finger contact position on the screen, a movement of the finger contact position on the screen, etc. are detected by the touch panel 17B. The digitizer 17C is an electromagnetic induction type pointing device which enables an input through the screen of the flat panel display 17A. A contact position of the pen 100 on the screen, a movement of the pen contact position on the screen, etc. are detected by the digitizer 17C.

The wireless communication device 107 performs a wireless communication such as a wireless LAN communication and/or a cellular communication. The EC 108 is a one-chip microcomputer including an embedded controller for power management. The EC 108 has a function of powering on/off the tablet PC 10 in response to a user manipulation of a power button.

Figure 6:
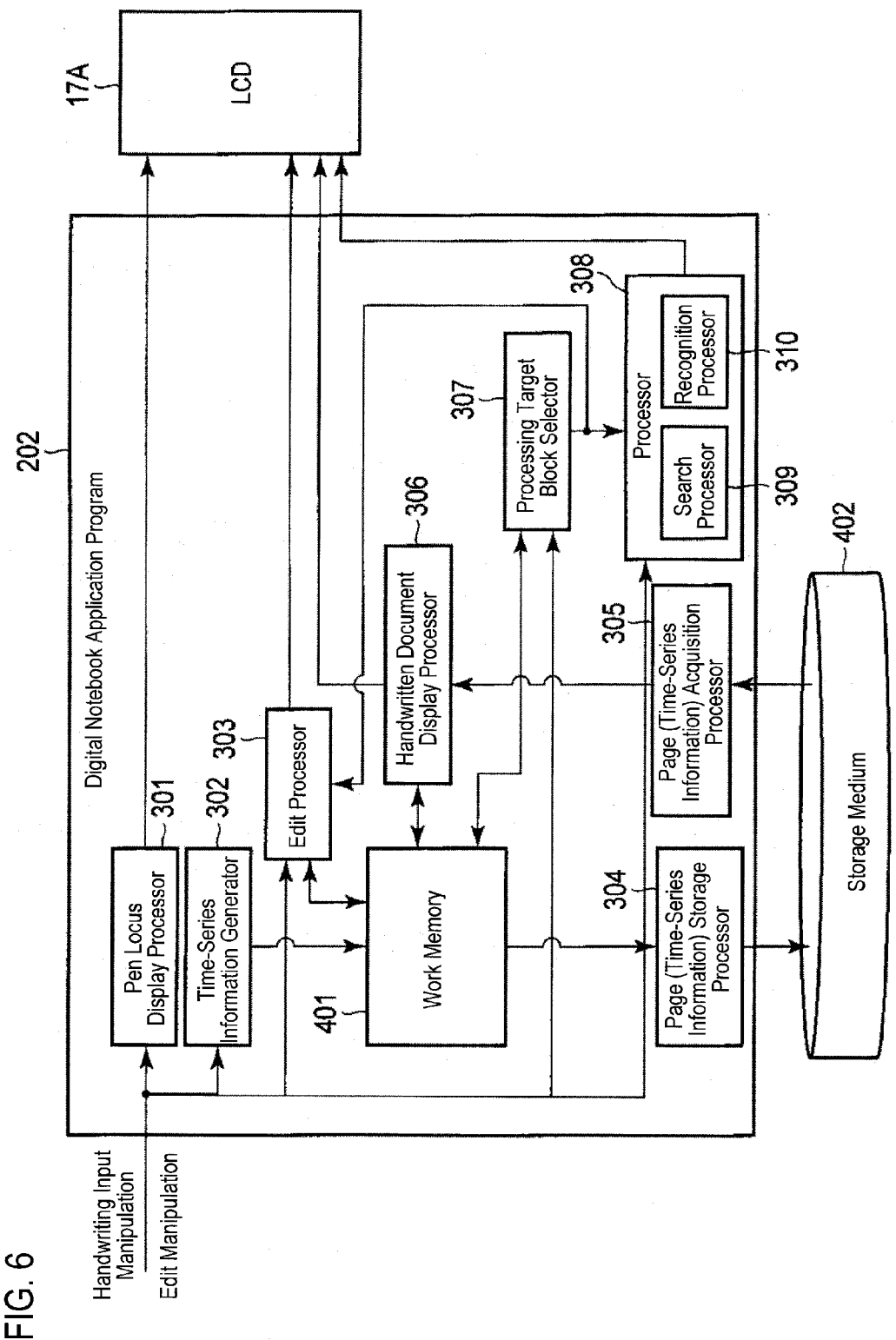
FIG. 6 is a block diagram showing an exemplary functional configuration of a digital notebook application program.

Next, the functional configuration of the digital notebook application program 202 will be described with reference to FIG. 6. The digital notebook application program 202 is provided with a pen locus display processor 301, a time-series information generator 302, an edit processor 303, a page storage processor 304, a page acquisition processor 305, a handwritten document display processor 306, a processing target block selector 307, a processor 308, etc. These function blocks may be implemented by the CPU 101, which runs the digital notebook application program 202.

The digital notebook application program 202 is configured to generate, display, edit, etc. a handwritten document using event information and the like that are input through the touch screen display 17. The touch screen display 17 detects occurrences of events such as "touch," "movement (slide)," "release," etc. The "touch" is an event indicating that an external object is in contact with the screen. The "movement (slide)" is an event indicating that a contact position of the external object is moved while the external object is kept in contact with the screen. The "release" is an event indicating that the external object is separated from the screen.

The pen locus display processor 301 and the time-series information generator 302 receive the event information indicating the "touch" or the "movement (slide)" generated by the touch screen display 17 to thereby detect a handwriting input manipulation. The event information indicating the "touch" includes coordinates of the contact position. The event information indicating the "movement (slide)" includes coordinates of a contact position at movement origin, coordinates of contact positions during movement, and coordinates of a contact position at a movement destination. The pen locus display processor 301 and the time-series information generator 302 receive a coordinate sequence corresponding to a movement locus (loci) of the contact positions from the touch screen display 17.

The pen locus display processor 301 displays a locus of each stroke on the screen of the flat panel display 17A of the touch screen display 17 based on the coordinate sequence received from the touch screen display 17. The pen locus display processor 301 displays each locus of, for example, the pen 100 during a period in which the pen 100 is kept in contact with the screen, that is, the locus of each stroke.

The time-series information generator 302 generates time-series information having the structure that has been described in detail above with reference to FIG. 4, based on the coordinate sequence received from the touch screen display 17. The time-series information generator 302 may cause a work memory 401 to temporarily store the generated time-series information, that is, sets of coordinates and time stamp information corresponding to respective points of the strokes.

The page storage processor 304 stores the time-series information in a storage medium 402 as a handwritten document (handwritten page). As mentioned above, the storage medium 402 may be any of the storage device provided in the tablet PC 10, the storage device provided in the personal computer 1, and the storage device 2A of the server 2.

The page acquisition processor 305 reads out an arbitrary piece time-series information stored in the storage medium 402 and sends it to the handwritten document display processor 306. The handwritten document display processor 306 displays the locus of each stroke on the screen as a handwritten page based on the received time-series information.

The edit processor 303 performs a process to edit the handwritten page being currently displayed. The edit processor 303 performs an edit process, for example, to delete or move one or more of the plural strokes being displayed according to an edit manipulation performed by the user on the touch screen display 17. For example, if the user has selected a menu item such as "delete" or "move" from an edit menu, the edit processor 303 performs a process of deleting, moving or the like a stroke(s) being selected by the processing target block selector 307. The user may delete arbitrary one of the plural strokes being displayed using an eraser tool, an opposite end portion of the pen 100, tapping with the pen 100, or the like. The user may move arbitrary one of the plural strokes being selected by the processing target block selector 307 by dragging and dropping it with an external object. The edit processor 303 updates the time-series information so as to reflect a result of such edit process to the time-series information being displayed. In the time-series information, the time-series coordinates of the stroke data of each moved stroke may be automatically changed according to a movement destination position. Manipulation history data indicating a change of the time-series coordinates of the stroke data of each moved stroke may be added to the time-series information. The time-series sets of coordinates of the stroke data of each deleted stroke need not always be deleted, and manipulation history data indicating the deletion of the stroke data of each deleted stroke may be added to the time-series information.

The processing target block selector 307 selects a portion, to be processed, of the time-series information, that is, a stroke (stroke data) to be processed, according to a user range specifying manipulation and/or a user stroke selecting manipulation. The user may specify, as a range, an arbitrary portion of a handwritten page (time-series information) being displayed using a range specifying tool which is used for enclosing an arbitrary portion on the screen by a circle or a rectangle. The user may select an arbitrary portion (at least one stroke) of a handwritten page (time-series information) being displayed by inputting a particular stroke in an arbitrary portion on the screen with an external object. The stroke(s) selected by the processing target block selector 307 are displayed in a different form than the other strokes, such as in a highlight manner, in a different color, in a thick line, or with an underline.

The particular stroke (hereinafter may be referred to as a "selection stroke") for selecting an arbitrary portion (at least one stroke) of a handwritten page (time-series information) being displayed may be one or more strokes having a predetermined shape. Examples of the particular stroke include looped lines such a circle and a rectangle and line segments such as a straight line and a wave line. The processing target block selector 307 may determine as to whether or not a stroke that has been input by the user is the selection stroke, by a pattern matching technique or using a degree of stroke similarity or the like. If the processing target block selector 307 determines that the stroke that has been input by the user is the selection stroke, the processing target block selector 307 may display the input selection stroke in a different form than the other strokes. In the case where the selection stroke is shaped like a looped line such as a circle or a rectangle, only a stroke(s) completely enclosed by the selection stroke may be selected. Alternatively, a stroke(s) at least part of which is enclosed by the selection stroke may be selected. Further alternatively, in addition to a stroke(s) enclosed by the selection stroke, a stroke(s) that are determined to be the same character or figure as the selection stroke may be selected. A stroke(s) enclosed by the selection stroke, excluding a stroke(s) that are discontinuous with the other strokes in terms of stroke order, may be selected. A selection stroke that is shaped like a looped line such as a circle or a rectangle may be either closed completely or opened partially. A region enclosed by such a selection stroke may be determined by, for example, assuming a line that connects the start point and the end point of the selection stroke. In the case where a selection stroke is shaped like a line segment such as a straight line or a wave line, only a stroke(s) that intersect the selection stroke may be selected. Alternatively, a stroke(s) that are included in a region close to such a selection stroke may also be selected. Further alternatively, a stroke(s) that are included in a region that is close to such a selection stroke and are located above or below the selection stroke may also be selected. Still further alternatively, in addition to a stroke(s) that intersect such a selection stroke and/or are included in a region close to such a selection stroke, a stroke(s) that are determined to be the same character or figure as the selection stroke may be selected. A stroke(s) that intersect such a selection stroke and/or are included in a region close to such a selection stroke, excluding a stroke(s) that are discontinuous with the other strokes in terms of stroke order, may be selected.

The processor 308 may perform various type of processes such as a locus search process, a recognition process, a deletion process, a movement process, a copying process, and a cutting process on or for a portion, to be processed, of time-series information selected by the processing target block selector 307. In the example of FIG. 6, a search processor 309 performs the locus search process and a recognition processor 310 performs a character recognition process.

The processor 308 performs any of the various types of processes on and/or for the portion, to be processed, of the time-series information according to a menu specifying manipulation or a stroke manipulation of the user. The user may specify details of the process by selecting and designating a menu bar item, a pull-down menu item, and/or an icon displayed on the screen. The user may also specify the details of the process by inputting a particular stroke in an arbitrary portion on the screen with an external object.

The particular stroke for specifying the details of the process (hereinafter referred to as a "process specifying stroke") may be any predetermined one or more strokes such as a symbol, a question mark ("?"), a star, a double circle, a spiral, an alphabetical letter, a Greek letter, a hiragana letter, a katakana letter, or a kanji letter. One type of process is associated with each type of process specifying stroke. The processor 308 may determine as to whether or not a stroke that has been input by the user is a process specifying stroke by a pattern matching technique or using a degree of stroke similarity or the like. If the processor 308 determines that the stroke that has been input by the user is the process specifying stroke, the processor 308 may display the input process specifying stroke in a different form than the other strokes.

The processor 308 may perform a process that is specified by a process specifying stroke on or for one or more strokes selected by a selection stroke only in prescribed cases such as a case where the process specifying stroke has been input after input of the selection stroke, a case where the selection stroke has been input after input of the process specifying stroke, a case where the selection stroke and the process specifying stroke have been input successively, a case where a time difference between inputs of the selection stroke and the process specifying stroke is shorter than a threshold value, a case where the selection stroke and the process specifying stroke at least partially overlap with each other, a case where the selection stroke includes the process specifying stroke, and a case where a distance between the selection stroke and the process specifying stroke is shorter than a threshold value.

The search processor 309 searches the plural pieces of time-series information (plural handwritten pages) stored in the storage medium 402 using, as a search key (search query), a portion of time-series information selected by the processing target block selector 307. The search processor 309 retrieves a stroke(s) that are similar in locus (i.e., have degrees of similarity equal to or higher than a reference value) to the stroke(s) corresponding to the portion of the time-series information from each of the plural pieces of time-series information and displays them on the screen of the flat panel display 17A in a visually recognizable manner.

The search process performed by the search processor 309 is a handwriting locus search. The search processor 309 retrieves a handwritten character string(s) that are similar in locus to the handwritten character string which is the search query from the already recorded plural handwritten pages. The handwriting locus search may be performed on only one handwritten page being displayed currently.

Various methods may be used to calculate a degree of similarity between handwritten characters. For example, the coordinate sequence of each stroke may be handled as a vector(s). In this case, to calculate a degree of similarity between comparison target vectors, an inner product between the comparison target vectors may be calculated. For another example, a degree of similarity may be calculated by dealing with the locus of each stroke as an image and employing, as a degree of similarity, an area of a portion where the images of comparison target loci overlap most. Arbitrary measures may be taken to further reduce a calculation process amount. DP (dynamic programming) matching may be used as a method for calculating a degree of similarity between handwritten characters.

The recognition processor 310 performs a recognition process(es) such as handwritten character recognition, handwritten figure recognition, and handwritten table recognition for a the portion of time-series information selected by the processing target block selector 307. The recognition processor 310 converts a handwritten page (time-series information) into application data having such a structure that it can be handled by word processing software, spreadsheet software, presentation software, and/or the like.

The handwritten character recognition process is a process of grouping plural stroke data indicated by the portion, to be processed of the time-series information, which is a recognition process target, and performing character recognition for each group to convert each group into a character code. The handwritten figure recognition process is a process of grouping plural stroke data indicated by the portion, to be processed, of the time-series information, which is a recognition process target, and determining for each group a figure object having the highest degree of similarity to convert each group into a figure object. The handwritten table recognition process is a process of recognizing a combination of vertical and horizontal lines (table shape) from plural stroke data indicated by the portion, to be processed, of the time-series information, which is a recognition process target, and converting it into a table object having the same numbers of elements in the vertical direction and the horizontal direction as the recognized table shape.

The processor 308 may delete both or only one of the selection stroke and the process specifying stroke after starting to perform the process specified by the process specifying stroke on or for one or more strokes selected by the selection stroke. The processor 308 may delete both or only one of the selection stroke and the process specifying stroke after completing to perform the process specified by the process specifying stroke on or for one or more strokes selected by the selection stroke. The processor 308 may delete both or only one of the selection stroke and the process specifying stroke after input of a stroke that is neither the process specifying stroke nor the selection stroke. The processor 308 may delete a stroke according to a user designation when deletion of a process specifying stroke or a selection stroke is commanded by the user through a dialog box. The processor 308 may delete the selection stroke if a stroke(s) selected by the selection stroke are displayed in a different form than the other strokes. Like the other types of strokes, each of the selection stroke and the process specifying stroke may be deleted using an eraser tool, an opposite end portion of the pen 100, by tapping with the pen 100, or the like.

Although the above description assumes that the digital notebook application program 202 and its function blocks are run by the CPU 101, the invention is not limited thereto. The entire processor 308 or at least one of the search processor 308 and the recognition processor 309 may be implemented by having the processor provided in the personal computer 1 or the processor of the server 2 run it. In this case, the tablet PC 10 may send, to the personal computer 1 or the server 2, any of (i) all time-series information of files (including plural pages) for which a process (for example, search) is to be performed, (ii) time-series information of a page being browsed by the user, and (iii) time-series information selected by the processing target block selector 307, and information indicating a type of a process to be performed on or for the time-series information.

All of the pen locus display processor 301, the time-series information generator 302, the edit processor 303, the page storage processor 304, the page acquisition processor 305, the handwritten document display processor 306, the processing target block selector 307, the processor 308, etc. may be implemented by having the processor provided in the personal computer 1 or the processor of the server 2 run them. In this case, the tablet PC 10 may send information of events, etc. detected by the touch screen display 17 and information of, for example, user manipulations on an edit menu to the personal computer 1 or the server 2, and receive image information indicating a final process result therefrom.

Each of the function blocks of the digital notebook application program 202 other than the time-series information generator 302 and the handwritten document display processor 306 may be implemented by having the processor provided in the personal computer 1 or the processor of the server 2 run them. In this case, the tablet PC 10 may send time-series information that is input by the user and information of, for example, user manipulations on an edit menu to the personal computer 1 or the server 2.

Where as described above at least one of the function blocks of the digital notebook application program 202 is implemented by having the processor provided in the personal computer 1 or the processor of the server 2 run it, the work memory 401 and the storage medium 402 are implemented by one of more storages of the storage device provided in the tablet PC 10, the storage device provided in the personal computer 1, and the storage device 2A of the server 2.

FIGS. 7A to 7D show exemplary user interface images which are displayed on the touch screen display 17 when the digital notebook application program 202 is run by the CPU 101.

FIG. 7A shows an image in which a selection stroke which is a circle is input to a handwritten document. In this case, the processing target block selector 307 selects strokes enclosed by the circle, that is, strokes constituting the word "Reduction".

FIG. 7B shows an image in which a process specifying stroke which is a question mark ("?") is input to the handwritten document in which the selection stroke has already been written. It is assumed that the question mark ("?") serving as the process specifying stroke indicates a search process. Since the selection stroke and the process specifying stroke have been input, the processor 308 performs the process designated by the process specifying stroke, that is, the search process.

Figure 7C:
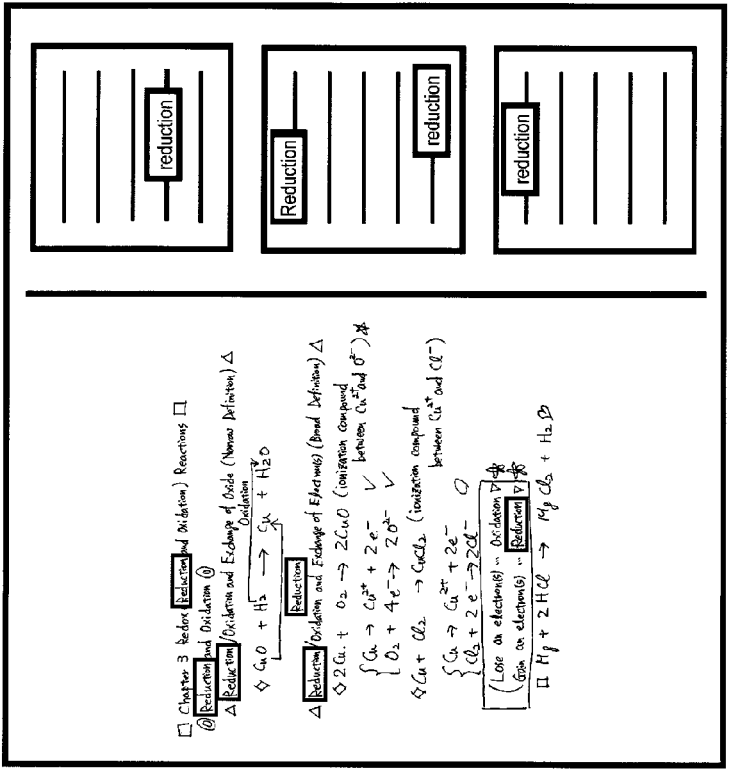
Figure 7D:
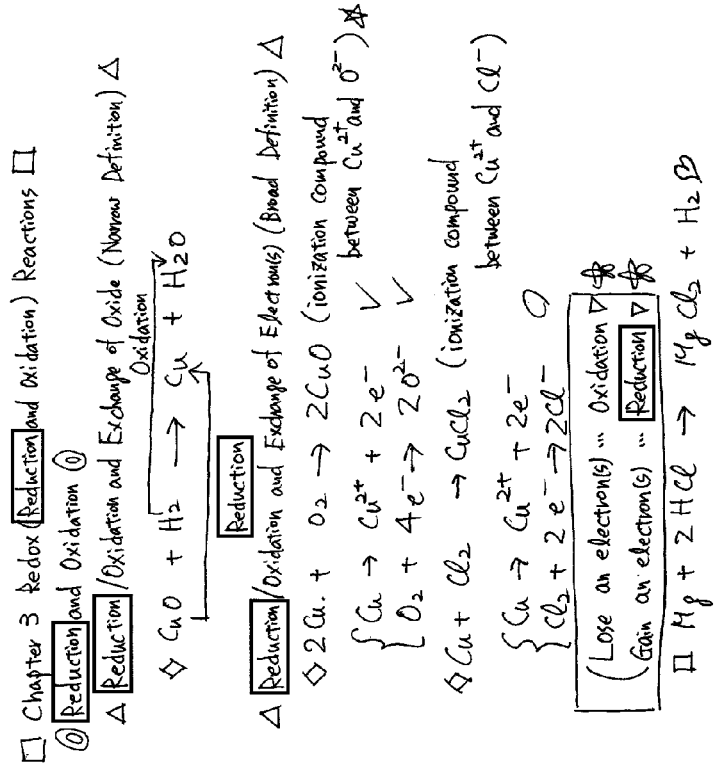

FIGS. 7C and 7D show images which show a search result. As shown in FIG. 7C and 7D, stroke groups (the words "reduction") which are high in the degree of similarity to the search query "reduction" are enclosed by rectangles. In the example of FIG. 7C, the page in which the selection stroke and the process specifying stroke are input continues to be displayed with the same size even after the search process. In the example of FIG. 7D, the page in which the selection stroke and the process specifying stroke are input continues to be displayed even after the search process although its size is reduced. In the example of FIG. 7D, thumbnails of pages being different from the page in which the selection stroke and the process specifying stroke are input and having a stroke group(s) which is high in the degree of similarity to the search query are displayed. Although in the example of FIG. 7D only three thumbnails are shown, another thumbnail(s) may be displayed using a scroll bar or the like.

As described above, the electronic apparatus according to the embodiments can perform various types of processes in response to input of the selection stroke and the process specifying stroke. Therefore, a handwritten document can be easily handled to thereby enhance the user's convenience.

It should be noted that the invention is not limited to the above embodiment itself. In the practicing stage, the invention may be embodied in such a manner that constituent elements are modified without departing from the spirit of the invention. Also, various inventive concepts may be perceived by properly combining plural constituent elements described in the embodiments. Also, several ones of the constituent elements of the embodiments may be omitted.

What is claimed is:

1. An electronic apparatus comprising:
a touch screen display; and
a processor configured to output, on a screen of the touch screen display, information regarding a plurality of strokes that are input on the touch screen display, wherein when a first stroke indicative of a selection of a first stroke group on the screen of the touch screen display and a second stroke indicative of a request for a search process are input, the processor is configured to output, on the screen of the touch screen display, information regarding a second stroke group with a degree of similarity to the first stroke group equal to or larger than a threshold value.

2. The apparatus of claim 1, wherein where the processor is configured to output, for display on the screen of the touch screen display, information of the second stroke group with the degree of similarity to the first stroke group equal to or larger than the threshold value, the processor is configured to delete at least the second stroke.

3. The apparatus of claim 1, wherein after a period expires in which the second stroke group with the degree of similarity to the first stroke group equal to or larger than the threshold value is to be displayed on the screen of the touch screen display, the processor is configured to delete at least the first stroke.

4. The apparatus of claim 1, wherein where a difference between a time at which the first stroke is input and a time at which the second stroke is input is equal to or longer than a first period, the processor is not configured to perform the search process to search for the second stroke group with the degree of similarity to the first stroke group equal to or higher than the threshold value.

5. The apparatus of claim 1, wherein where a distance between a position of the first stroke and a position of the second stroke is equal to or larger than a first value, the processor is not configured to perform the search process to search for the second stroke group with the degree of similarity to the first stroke group, equal to or higher than the threshold value.

6. The apparatus of claim 1, wherein after the second stroke is input, the processor is configured to notify that the search process to search for the second stroke group with the similarity to the first stroke group, equal to or higher than the threshold value can be performed.

7. The apparatus of claim 1, wherein where the first stroke has a closed loop shape drawn with a single stroke, the processor is configured to determine whether the first stroke group is entirely included in the closed loop shape or partially included in the closed loop shape.

8. The apparatus of claim 1, wherein where a third stroke indicative of a cancellation of the selection of at least a part of the first stroke group is input after the first stroke is input, the processor is configured to determine that the first stroke group excluding the canceled part of the first stroke group is selected.

9. The apparatus claim 1, wherein among information of one or more strokes being displayed on the screen of the touch screen display, the processor
- is configured to output, for display in a first form, information of a fourth stroke with a degree of similarity to the first stroke group equal to or larger than the threshold value, and
- is configured to output, for display in a second form different from the first from, information of a fifth stroke with a degree of similarity to the first stroke group less than the threshold value.

10. A method configured to use a touch screen display and a processor, the method comprising:
- displaying, on a screen of the touch screen display, a plurality of strokes that are input on the touch screen display; and
- when a first stroke indicative of a selection of a first stroke group on the screen of the touch screen display and a second stroke indicative of a request for a search process are input, displaying, on the screen of the touch screen display, a second stroke group with a degree of similarity to the first stroke group equal to or larger than a threshold value.

11. A non-transitory computer-readable storage medium storing a program configured to cause a processor to execute a process, the process comprising:
- displaying, on a screen of a touch screen display, a plurality of strokes that are input on the touch screen display; and
- when a first stroke indicative of a selection of a first stroke group on the screen of the touch screen display and a second stroke indicative of a request for a search process are input, displaying, on the screen of the touch screen display, a second stroke group with a degree of similarity to the first stroke group equal to or larger than a threshold value.

12. The method of claim 10, further comprising:
- displaying on the screen of the touch screen display, information of the second stroke group with the degree of similarity to the first stroke group equal to or larger than the threshold value, and
- deleting at least the second stroke.

13. The method of claim 10, further comprising
- displaying on the screen of the touch screen display, information of the second stroke group with the degree of similarity to the first stroke group equal to or larger than the threshold value, and
- deleting at least the second stroke.

14. The method of claim 10, wherein where a difference between a time at which the first stroke is input and a time at which the second stroke is input is equal to or longer than a first period, further comprising not performing the search process to search for the second stroke group with the degree of similarity to the first stroke group equal to or higher than the threshold value.

15. The non-transitory computer-readable storable medium of claim 11, the process further comprising:
- displaying on the screen of the touch screen display, information of the second stroke group with the degree of similarity to the first stroke group equal to or larger than the threshold value, and
- deleting at least the second stroke.

16. The non-transitory computer-readable storable medium of claim 11, the process further comprising:
- displaying on the screen of the touch screen display, information of the second stroke group with the degree of similarity to the first stroke group equal to or larger than the threshold value,
- deleting at least the second stroke.

17. The non-transitory computer-readable storable medium of claim 11, wherein where a difference between a time at which the first stroke is input and a time at which the second stroke is input is equal to or longer than a first period, the process further comprising not performing the search process to search for the second stroke group with the degree of similarity to the first stroke group equal to or higher than the threshold value.

* * * * *